July 25, 1950  N. W. CHAPPELL  2,516,549
SEMIRIMLESS SPECTACLE MOUNTING
HAVING FLEXIBLE LENS RETAINERS
Filed Oct. 20, 1947
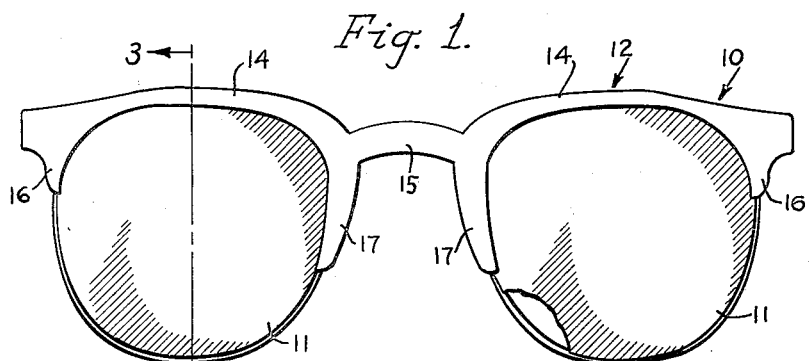
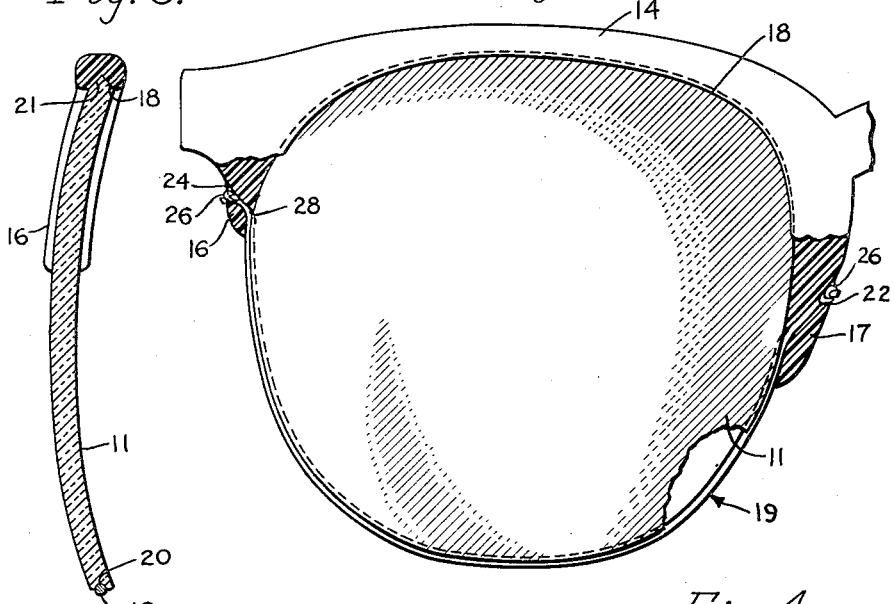
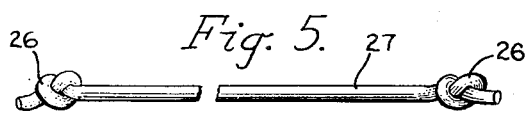
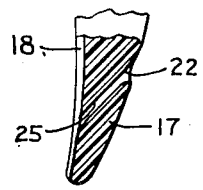
INVENTOR.
N. W. CHAPPELL
BY
Kimmel & Crowell Patented July 25, 1950

2,516,549

UNITED STATES PATENT OFFICE 2,516,549

SEMIRIMLESS SPECTACLE MOUNTING HAVING FLEXIBLE LENS RETAINERS

Norman W. Chappell, London, England

Application October 20, 1947, Serial No. 780,963

1 Claim. (Cl. 88—47)

This invention relates to spectacles and more particularly to an improved means for supporting the lens on a partial frame.

It is an object of this invention to provide an improved mounting means for a spectacle lens for mounting the lens from the top bar and arms of a partial frame constituting the upper lens receiving portion of the frame in such a manner that the lower supporting means for the lens is substantially invisible giving the appearance that the lens depends and is wholly supported or suspended from the top bar.

Another object of this invention is to provide an improved lens mounting means of the kind to be more particularly described hereinafter, so constructed and arranged that the lens is supported from the top bar in such a manner that the eye or lens wire or frame may be terminated closely adjacent the upper end of the side edges of the lens so that an improved and enlarged field of vision may be obtained by the elimination of the ordinary frame at the lower portions of the sides and lower edges of the lens.

Still another object of this invention is to provide an improved lens mounting means of this kind which is readily adaptable to volume manufacturing methods.

A further object of this invention is to provide a lens mounting means of this kind in which the lens is supported about the complete outer edge thereof, the supporting means about the side and bottom edges of the lens being substantially invisibly concealed within the edges of the lens and those portions of the top bar with which the supporting means is engaged.

Still another object of this invention is to provide an improved lens mounting in which a flexible nylon thread or cord is secured between the temple and nasal arms of a partial lens rim by engaging in openings at the lower ends of the arms. The nylon cord is formed with a knot or enlarged terminal at each end which is adapted to be wedged in the openings and secured there by sealing and anchoring means as by filling the opening with a plastic material of substantially the same material as the rim itself disposed around and embedding said ends.

Still a further object of this invention is to provide an ophthalmic mounting of this kind in which a length of wire is carried by the partial lens rims or frames for supporting engagement with the lower edges of the lens, the wire engaging in openings through the rims and secured by an enlargement on the ends of the wire formed by suitable means such as a drop of solder for wedging the ends of the wire in the rims.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a front elevation, partly broken away of an ophthalmic mounting constructed according to an embodiment of this invention;

Figure 2 is a front elevation, partly broken away and partly in section of one side of the partial frame;

Figure 3 is a vertical section taken on the line 3—3 of Figure 1;

Figure 4 is a fragmentary detailed section of the nasal bar of the partial frame;

Figure 5 is a side elevation partly broken away showing a length of resilient lens supporting member removed from the frame, and Figure 6 is a side elevation, partly in section and partly broken away of a metal lens supporting member removed from the frame.

Referring to the drawings, the numeral 10 designates generally an improved spectacle or lens frame for removably supporting the lens 11 from a partial frame. The mounting 10 comprises a top bar portion or member 12 of a partial frame which extends across the frame and over both of the lenses including a top bar 14 immediately above each of the lenses connected together by a bridge 15. The mounting 10 is formed with a depending temple arm 16 on the outer end of each of the top bars 14 and nasal bar 17 depending from the inner end or side of each top bar 14 and the ends of bridge 15 at the juncture thereof. The temple bars 16 depend from the outer ends of the top bars 14 for only a short distance and the nasal bars or arms 17 depend from the inner ends of the top bars 14 for a distance slightly greater than the length of the temple arms 16.

The partial frame 10 is preferably made of Zylo or other suitable composition material or metal. The lenses 11 are adapted to be secured in the partial frame 10 between the nasal and temple arms 16 and engaging the top bar 14. The bar 14 of the partial frame having the top portion or member 12 and arms 16 and 17 are formed with a groove 18 along the inner edge thereof within which the upper edge of the lens 11 is adapted to be engaged.

The arms 16 and 17 depend from the bar 14 in a slightly convergent manner downwardly for partially clamping the lens 11 therebetween. As the lens 11 requires a more secure support than the frictional or clamping engagement afforded by the arms 16 and 17, there is provided a flexible resilient lens supporting member 19 embracing the lower edge portion of the lens and engageable at its ends in the temple arm 16 and the nasal arm 17 and engaging within a groove about the lower edge of the lens. The lens 11 is formed with a peripheral groove 20 about the side edges thereof and the lower edge below the arms 16 and 17, the upper end portions of groove 20 extending up partially within the lower portions of the arms 16 and 17 as shown in Figure 2. The supporting member 19 is adapted to be concealingly engaged within the groove 20 of the lens 11 giving the appearance that the lens is supported solely from the partial frame 10. The upper edge of the lens 11 is provided with a substantially triangular bevel 21 engageable in the groove or recess 18 of the arms 16 and 17 and top bar 14. For engagement and anchoring of the ends of the supporting member 19 in the supporting arms 16 and 17 each of the arms is provided with an opening as 22 and 24 therein both inclined downwardly and inwardly from the outer to the inner edges of the arms toward the opposite side edges of the lens. The opening 22 in the nasal arm 17 is extended through the arm at a downwardly and inwardly inclined position. The opening 22 like opening 24 each is substantially frusto-conical in shape having the divergent inwardly tapered or outwardly flared enlarged outer end portion thereof disposed inwardly of or within the outer edges of the arms 16 and 17 of the frame 10. The opening 22 is provided with a reduced diameter inner section 25 and openings 24 and 22 extend to the inside or inner edges of the arms 16 and 17 of frame 10 at the lower portions of groove 18 immediately adjacent the lens 11 and upper ends of the groove 20 in the lens edge.

The flexible supporting member or strand 19 for the lens may be made of various materials and preferably I use a nylon thread which is suitably resilient, elastic or stretchable, tough and strong and provides a satisfactory support for the lens. As the nylon is a material having substantially the same characteristics as the Zylo from which the frame is made and as the nylon is substantially colorless, it will provide a practically invisible support for the lens. Alternatively the nylon may be dyed to any colour to give a delicate hue to the edge of the lens or to mate with the lens or frame.

The nylon thread however is subject to cracking or being otherwise severed on folding the thread sharply. For this reason, the openings 22 and 24 are inclined downwardly and inwardly toward the lens through the arms 16 and 17. In this manner the nylon thread is smoothly faired from the openings into the groove 20 of the lens or from the groove 20 into and through the openings 22 and 24 without abrupt or sudden angular deviation to prevent weakening, fracture or breaking of the thread at such points. For securing the nylon thread in the opening a wedge may not be used as this will materially deteriorate the thread at the point of contact. Preferably I knot the end of the thread as indicated by the numeral 26 in Figure 5. The knot 26 will then be countersunk or disposed within the enlarged outer portion of the opening 22 and may be secured therein by a composition of Zylo and acetate or other material suitable for sealing the knot smoothly within the arms at the outer surfaces thereof. In the original installation of the nylon thread 27, threads of predetermined length are initially formed and a knot 26 is formed on one end thereof.

The free unknotted end of the thread 27 is initially trained through the opening 22 and restricted portion or reduced diameter inner section 25 therein of the nasal bar 17. The free end of the thread 27 is then engaged through the restricted opening 28 and flared or enlarged outer end portion of opening 24 of the temple bar 16 and a knot 26 is formed on the free end. Both knots 26 are then firmly embedded tightened or wedged in the enlarged outer portions of the openings and are secured therein by the sealing material or plastic cementitious composition as described above.

For engaging the lens 11 within the partial frame the upper edge of the lens is initially engaged in the groove 18 of the frame. The nylon thread 27 is then slid over the edge of the lower end of the lens for engagement within the groove 20. The nylon thread 27 is originally of a length slightly less than the length of the edge of the lens with which it is to engage so that the thread must be slightly stretched and will resiliently support the lens on the frame.

For removing the thread 27 a pin or other pointed or sharp edged tool may be used for dislodging the thread from the groove 20 at which time the lens may then be slid downwardly from the partial frame. While the nylon thread is deemed preferable a short length of suitably resilient wire as 30 may also be used for the supporting member of the lens. The partial frame as described above is exactly the same as that used for the nylon thread. In the use of a length of resilient wire 30 the wire is originally cut to a determined length. The free ends of the wire 30 will then engage in the openings 22 and 24 between the arms 16 and 17. An enlarged end as 31 is formed on the free ends of the wire 30 as by drops of solder or the like and the enlargement will engage within the enlarged openings 22 and 24. The drops of solder or other enlargements on the ends of the wire are made and located before the lens 11 is applied. The drops of solder 31 are wholly contained within the openings 22 so that there will be no projections from the arms 16 and 17. The lens is inserted by firstly engaging the wire in the groove in the lens, warming the xylonite and then springing the lens into the top bar while it is still resilient with the heat. In both instances the supporting member designated generally as 19 will be substantially contained within the groove 20 of the lens where it is substantially concealed from view and gives the appearance that the lens is wholly supported at its upper edge within the partial frame.

Alternatively the nylon can first be engaged in the groove running round the lower edge of the lens and by exerting pressure on the lens in a downward direction the nylon can be stretched and the upper part of the lens sprung into the top bar.

I claim:

An ophthalmic mounting comprising a frame including upper lens rims having V-shaped grooves in the lower sides thereof, depending temple flanges at the outer ends of said rims, depending nasal flanges at the inner ends of said rims, a bridge connecting the inner ends of said rims together, said temple and nasal flanges also having V-shaped grooves, a lens for each rim having a bevelled upper edge seated in said grooves and having an edge groove about the lower portion thereof extending from said bevelled edge, each of said temple flanges having a downwardly and inwardly inclined opening with each opening formed at its outer upper end with a flared opening, each of said nasal flanges having a downwardly and inwardly inclined opening with said latter openings being flared at their upper ends, and a flexible lens retainer seated in said lens groove and engaging at the opposite ends thereof in said temple flange and nasal flange openings, each retainer being formed with an enlargement at each end thereof engaging in said flared opening.

NORMAN W. CHAPPELL.

REFERENCES CITED

The following references are of record in the file of this patent:

UNITED STATES PATENTS

| Number | Name | Date |
| --- | --- | --- |
| 190,530 | Yocco | May 8, 1877 |
| 500,014 | Lazarus | June 20, 1893 |
| 591,152 | Bausch | Oct. 5, 1897 |
| 1,055,904 | Hansen | Mar. 11, 1913 |
| 1,143,502 | Burton | June 15, 1915 |
| 2,329,100 | Chappell | Sept. 7, 1943 |

FOREIGN PATENTS

| Number | Country | Date |
| --- | --- | --- |
| 794,129 | France | Dec. 2, 1935 |